United States Patent [19]

Naderhoff

[11] Patent Number: 5,204,385
[45] Date of Patent: Apr. 20, 1993

[54] WATER REDUCIBLE EPOXY RESIN CURING AGENT

[75] Inventor: Bryan A. Naderhoff, Pensacola, Fla.

[73] Assignee: Reichhold Chemicals, Inc., Durham, N.C.

[21] Appl. No.: 618,489

[22] Filed: Nov. 27, 1990

[51] Int. Cl.$^5$ .................. C08L 63/00; C08L 63/02; C08L 63/04
[52] U.S. Cl. .................. 523/417; 523/402; 525/504; 528/119
[58] Field of Search .................. 523/404, 417, 402; 525/504; 528/119

[56] References Cited

U.S. PATENT DOCUMENTS

| 3,839,252 | 10/1974 | Bosso et al. | 523/417 |
| 4,001,156 | 1/1977 | Bosso et al. | 523/414 |
| 4,316,003 | 2/1982 | Dante et al. | 528/111 |
| 4,448,912 | 5/1984 | Becker et al. | 523/404 |
| 4,539,347 | 9/1985 | DeGooyer | 523/404 |
| 4,540,725 | 9/1985 | Jerabek et al. | 523/351 |
| 4,566,963 | 1/1986 | Ott et al. | 523/415 |
| 4,608,405 | 8/1986 | DeGooyer | 523/404 |
| 4,824,927 | 4/1989 | Dobbelstein et al. | 523/417 |
| 5,089,100 | 2/1992 | Debroy et al. | 204/181.7 |
| 5,096,556 | 3/1992 | Corrigan et al. | 204/181.7 |

FOREIGN PATENT DOCUMENTS 173214  3/1986  European Pat. Off. ............ 523/404

Primary Examiner—John C. Bleutge
Assistant Examiner—D. E. Aylward
Attorney, Agent, or Firm—Rodman & Rodman

[57] ABSTRACT

A curing agent for a water borne epoxy resin composition wherein the curing agent is the reaction product of a chemical excess of a polyfunctional epoxide compound and a quaternary ammonium salt in which substantially all of the excess epoxide groups in the reaction product are subsequently consumed in a reaction with a polyamine. A process for preparing the curing agent and a hardenable film forming coating composition containing as essential components, the curing agent, at least one water dispersible epoxy resin and water is also disclosed.

23 Claims, No Drawings

WATER REDUCIBLE EPOXY RESIN CURING AGENT

BACKGROUND OF THE INVENTION

1. Field of the Invention

This invention relates to a water reducible epoxy resin curing agent and a method for preparing the curing agent and more particularly to water reducible amine functional epoxy curing agents suitable for cross-linking epoxy resins in water borne systems.

2. Description of the Prior Art

Epoxy resins are used as protective coatings for a variety of substrates which are exposed to harsh environmental or use conditions. The epoxy resin coating compositions have been applied as solutions in organic solvents. In view of the air pollution caused by the use of organic solvents and the increasing scarcity and cost of these solvents, there is a continuing search for new and improved epoxy coating compositions which can be reduced or dispersed in water.

In the commercial use of epoxy resin based coating compositions, it is desirable that these coating compositions cure or harden rapidly at room temperature. Water borne epoxy resin coating compositions known to the art generally require elevated temperatures of about 300° to 500° F. to effect hardening. For example U.S. Pat. No. 4,332,709 to Kooijmans discloses water soluble binders for can lacquers prepared by reacting an epoxy resin, specifically a polyglycidyl ether of polyhydric phenol with an aliphatic amino carboxylic acid such as glycine, alamine and glutamic acid, wherein the acid groups have been neutralized with a base such as an alkali metal hydroxide, tertiary amine or quaternary ammonium hydroxide. The coating composition comprising the epoxy resin and cross-linking agent is hardened by heating at 175°–210° C. (350°–400° F.) for 2–10 minutes.

U.S. Pat. No. 3,962,165 to Bosso et al discloses water dispersible electrodepositable quaternary ammonium salt containing resins based on polyglycidyl ethers of polyphenols. Once electrodeposited, the coatings are baked at 250° to 500° F. for 1 to 30 minutes to harden.

U.S. Pat. No. 4,246,087 to Tsou et al discloses a method for electrodepositing a film forming resin which is the reaction product of an oxirane containing material with a tertiary amine salt and optionally a fatty acid moiety. When combined with a melamine or a blocked isocyanate, the composition is electrodeposited and cured at elevated temperature.

U.S. Pat. No. 4,486,280 to Hosoi et al discloses a self-curing water dispersible epoxy resin composition produced by electron beam irradiation of a mixture of an epoxy resin and a quaternary alkyl ammonium salt of an $\alpha,\beta$-unsaturated carboxylic acid or a neutralized product of an $\alpha,\beta$ unsaturated carboxylic acid and a tertiary amine. Aqueous dispersions of the coating composition are cured at 150° C. (300° F.) for 10 minutes.

U.S. Pat. No. 4,094,844 to Allen discloses hydrolytically stable water-soluble epoxy coating compositions curable with amino (melamine) resin curing agents prepared by (1) condensing an excess of a lower molecular weight epoxy resin with an amino-substituted benzoic acid, (2) reacting the terminal epoxide groups of the resulting condensate with a secondary amine and (3) solubilizing the product by reacting the carboxyl groups with a tertiary amine. The resultant epoxy coating composition is cured by heating for 2 to 10 minutes at 350° to 400° F.

U.S. Pat. No. 4,098,735 to Tobias discloses a water borne epoxy ester coating composition which is the adduct of a polyfunctional 1,2-epoxy resin and a monocarboxylic acid with a saturated dibasic acid and trimellitic anhydride, wherein free carboxyl groups are neutralized with ammonia or amine. The coating is cured by baking at 350° to 450° F. for 2 to 10 minutes.

The prior art also teaches water borne epoxy resin based coatings which are curable at room temperature. For example, U.S. Pat. No. 4,246,148 to Shimp et al discloses a room temperature curable, two component aqueous epoxy resin coating system in which there is dissolved a polyamine terminated epoxy resin end-capped with a monoepoxide and a micro-emulsified low molecular weight polyepoxide cross-linker.

U.S. Pat. No. 4,316,003 to Dante et al discloses epoxy curing agents useful in water borne, room temperature air dryable epoxy resin formulations prepared by first reacting an epoxy compound with less than a stoichiometric amount of a primary monoamine and then reacting the resulting condensate with a stoichiometric excess of a polyfunctional amine.

Although room temperature curing water borne epoxy resin coating systems have been in commercial use for some time, these systems have one or more of the following drawbacks: slow cure rates and dry times, poor early water resistance and short pot life.

SUMMARY OF THE INVENTION

The present invention is directed to water reducible epoxy curing agents which are prepared by (a) first reacting a chemical excess of a polyfunctional epoxide compound with a quaternary ammonium salt and then (b) condensing the unreacted epoxide groups of the reaction product of (a) with a polyamine.

The water reducible epoxy curing agents of the present invention when combined with epoxy resins result in water borne coating systems which exhibit excellent early water resistance, improved pot-life on the order of about 8 hours or greater, and dry relatively rapidly in air at room temperature. For example, a 1 hour cure can obtain a tack-free coating.

DESCRIPTION OF THE PREFERRED EMBODIMENTS

The water reducible curing agents prepared in accordance with the present invention are distinguished from water soluble compositions. The term "water reducible" as used herein indicates compositions which contain organic solids in particulate form that are dispersed in water. The particle sizes present in the composition are generally less than about 10 microns and preferably have an average particle size range of about 0.05 to 5 microns.

The curing agents yield stable, uniform dispersions over a wide range of aqueous system concentration. In the preparation of water borne epoxy resin coating systems, the curing agent is incorporated in the system at a solids concentration of about 5 to about 40% solids by weight concentration, and preferably the percent solids concentration range is about 10 to 30% by weight.

Examples of polyfunctional epoxide compounds useful in the preparation of water reducible epoxy curing agents of the present invention include epoxide compounds containing more than one 1,2 epoxide group in the molecule and which can be reacted with quaternary ammonium salts and polyamines to form the water reducible curing agents in accordance with the invention. The term "polyfunctional epoxide compound" includes within its meaning epoxy resins.

Illustrative of polyfunctional epoxide compounds useful in the practice of the present invention include epoxyethers prepared by the reaction of epichlorohydrin in a basic medium with a polyhydric phenol. Illustrative of polyhydric phenols reactive with epichlorohydrin to prepare the epoxy ethers include polyhydric phenols such as resorcinol, hydroquinone, bis-(4-hydroxyphenyl)-methane, bis-(4-hydroxy-3-methylphenyl)-methane, bis-(4-hydroxy-3,5-difluorophenyl)-methane, 1,1-bis-(4-hydroxyphenyl)-propane, 2,2-bis(4-cyclohexanol)propane 2,2-bis-(4-hydroxy-3-methyl phenyl)-propane, 2,2-bis-(4-hydroxy-3-chlorophenyl)-propane, bis-(4-hydroxy phenyl)-phenyl methane, bis-(4-hydroxy phenyl) diphenyl methane, bis-(4 hydroxy phenyl)-4'-methyl phenyl methane, bis-(4-hydroxy phenyl) cyclohexyl methane, 4,4' dihydroxydiphenyl, 2,2' dihydroxy diphenyl, and polycyclopentadiene polyphenols.

An especially preferred polyfunctional epoxy composition for use in the invention is a polyphenyl glycidyl ether, for example, the reaction product of epichlorohydrin and 2,2-bis(4-hydroxy phenyl) propane, also known as "bisphenol A", this epoxy resin having the theoretical structural formula:

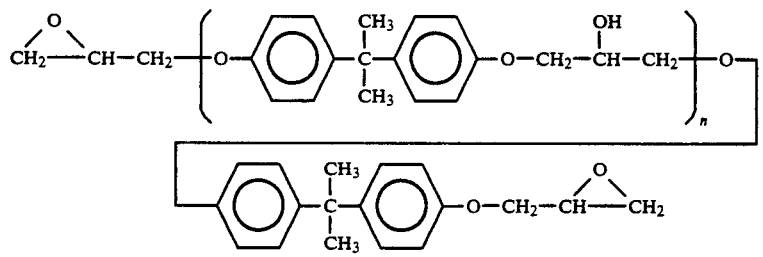

In the above formula, n varies from about 0 to 5, preferably about 0 to 1, and most preferably about 0 to 0.2. These epoxy resins generally have an average molecular weight of about 345–400 and an epoxide equivalent weight of about 175 to 200.

Suitable epoxides can also be prepared by blending or coreacting the diglycidyl ether of 2,2-bis (4-hydroxylphenyl) propane and the glycidyl ethers of phenol-formaldehyde condensates. Particularly suitable epoxides are higher molecular weight analogs of the diglycidyl ether of bisphenol A which have epoxide equivalent weights ranging from about 300 to 2500 and most preferably from about 300 to 900.

The above-mentioned polyfunctional epoxide compounds can be reacted individually or in admixture with a tertiary amine quaternary ammonium salt to prepare an epoxy intermediate which can then be reacted with a polyamine to prepare the water reducible epoxy curing agents of the present invention.

In preparing the polyfunctional epoxide reactant for use in the preparation of the water reducible curing agents of the present invention, it is often advantageous to utilize an admixture of diglycidyl ether of a polyhydric phenol such as bisphenol A and an epoxy novolac and to incorporate in such admixture a quantity of a polydric phenol as a co-reactant.

In preparing the polyfunctional epoxide for reaction with the quaternary ammonium salt, it is advantageous to dissolve the polyfunctional epoxide composition in a suitable solvent such as a glycol ether solvent which can be ethylene glycol monopropyl ether or ethylene glycol monobutyl ether.

Additional polyfunctional epoxy compounds useful in the practice of the present invention include phenol-aldehyde condensation products such as the glycidyl ethers of phenol-aldehyde resins such as the epoxy novolac resins. The starting novolac material is generally the reaction product of a mono or dialdehyde, most usually formaldehyde or paraformaldehyde with a phenolic material such as unsubstituted phenol and the various substituted phenols such as the cresols, alkyl and aryl substituted phenols such as p-tert-butylphenol, phenyl phenol and the like.

In the typical reaction scheme, the aldehyde, for example, formaldehyde, is reacted with the phenol under acidic conditions to prepare a polyphenolic material or novolac. In preparing epoxy novolac resins, the novolac is reacted with epichlorohydrin and dehydrohalogenated under basic conditions to produce the epoxy novolac resin. Epoxy novolac resins useful in the practice of the present invention generally have an average epoxy functionality of about 2 to 7.5 and preferably about 2 to 4.

Preferred epoxy novolac resins of this type are those of the formula

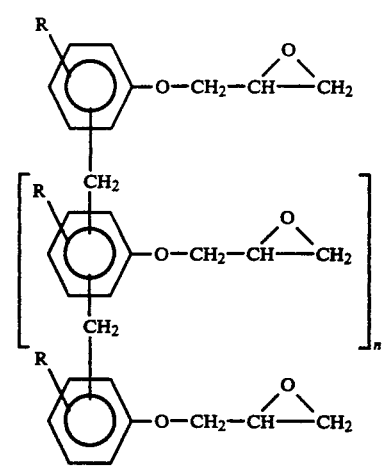

wherein R is hydrogen or an alkyl radical containing about 1 to 4 carbon atoms and n has a value less than 7.5 and preferably less than about 5.0.

The epoxy novolacs are available commercially. For example, the glycidyl ether of a phenol-formaldehyde condensate with an average epoxy functionality of 3.6 is available from the Dow Chemical Company under the trademark D.E.N. 438 and Dainippon Ink and Chemicals as Epiclon ® 738.

To accelerate the co-reaction of the polyhydric phenol with the epoxy resin admixture, a small amount, for example, about 0.005 to 0.15% by weight and preferably about 0.01 to 0.1% by weight of a suitable catalyst such as ethyl triphenyl phosphonium acetate, or ethyl triphenyl phosphonium iodide and the like are incorporated in the reaction admixture, and the co-reactants heated at about 120° to 180° C. for about 20 to 100 minutes to prepare a polyfunctional epoxide compound suitable for preparation of the curing agents of the present invention.

The quaternary ammonium salts used to prepare the water reducible curing agents of the present invention are salts of tertiary amines and low molecular weight monocarboxylic acids having 1 to 3 carbon atoms such as formic acids, acetic acids, or lactic acid, with acetic acid being particularly preferred.

Tertiary amines useful in the preparation of the quaternary ammonium salts of the present invention include the aliphatic tertiary amines and their aromatic substituted derivatives such as triethylamine, tri-n-propylamine, triisopropylamine, tributylamine, dimethylaniline, higher homologous and isomeric trialkyl, dialkylaryl and alkyldiarylamines, various N-substituted tertiary amines having different organic radicals, for example, alkyl, aryl, alkaryl or aralkyl, on the amine nitrogen atom, benzyldimethylamine and methylbenzyldimethylamine, with cyclic compounds such as N-methyl morpholine and 4-ethyl morpholine, being preferred.

The quaternary ammonium salt which is reacted with the polyfunctional epoxide compound in the practice of the present invention is prepared by simply mixing the tertiary amine and carboxylic acid at substantially equal molar ratios with or without external heat and in the presence or absence of volatile solvents as the reaction media.

To prepare the water reducible curing agents of the present invention an excess of the polyfunctional epoxide compound is reacted with the quaternary ammonium salt. Generally, the ratio of quaternary ammonium salt equivalents to epoxy equivalents ranges from about 0.05:1.0 to about 0.8:1, with the preferred ratio of equivalents being in the range of about 0.1:1 to about 0.3:1.

The reaction between the polyepoxide compound and quaternary ammonium salt is generally performed at a temperature of about 50° to 100° C., and preferably about 60° to 80° C. The reaction is generally completed in about 30 to about 90 minutes.

In order to maintain a workable viscosity during the reaction between the quaternary ammonium salt and the polyepoxide, it is advantageous to conduct the reaction in the presence of a solvent. Suitable solvents for the reaction include glycol ether solvents such as ethylene glycol monobutyl ether and ethylene glycol monopropyl ether. These same solvents are generally used to prepare water borne epoxy resin systems and therefore may advantageously be used as the reaction medium for the preparation of the polyepoxide/quaternary ammonium salt intermediate reaction product. Water can also be used as a solvent.

The remaining epoxy functionality in the polyepoxide/quaternary ammonium salt reaction product is then reacted with a polyamine to form an adduct, in the ratio of about 0.3:1.0 to about 1.3:1.0 moles of amine to epoxy equivalents.

Polyamines suitable for reaction with the epoxy resin/quaternary ammonium salt reaction product include aliphatic, cycloaliphatic, araliphatic amines or mixtures thereof. Illustrative of the polyamines that can be used in the practice of the present invention are aliphatic, saturated or unsaturated bifunctional amines, such as lower aliphatic alkylene polyamines, for example, ethylene diamine, 1,2-propylene diamine, 1,3-propylene diamine, 1,4-butylene diamine, hexamethylene diamine, 2,2,4-(2,4,4) trimethyl hexamethylene diamine, polyalkylene polyamines, for example, homologous polyethylene polyamines such as diethylene triamine, triethylene tetraamine, tetraethylene pentamine or analogous polypropylene polyamines such as for example analogous polypropylene polyamines such as for example dipropylene triamine, polyoxypropylene polyamines and diamines of the general formula H₂NCH—X—CH₂NH wherein X represents a divalent group of the formula:

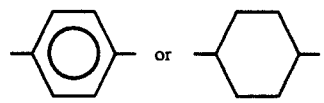

including 1,2-, 1,3- and 1,4-bis-(aminomethyl) benzene or mixtures of these isomers and 1,2- and 1,3- and 1,4-bis-(amino methyl) cyclohexane or mixtures of these isomers. Further examples of compounds which can be used are isophorone diamine (that is, 1-amino-3-aminomethyl-3,5,5-trimethyl cyclohexane), m-xylene diamine and N-aminoethyl piperazine. Other suitable polyamines include the polyoxypropylene amines which are commercially available under the trademark "Jeffamine" manufactured by Texaco Chemical Co.

The reaction of the polyamine and the polyepoxide/quaternary ammonium reaction product is exothermic and it is advantageous to incorporate water in the reaction medium prior to the addition of the polyamine. The water functions as a heat sink for the reaction mass. Generally about 30 to 80% by weight water is incorporated in the reaction medium and preferably about 40 to 60% by weight.

The reaction of the polyamine with the polyepoxide/quaternary ammonium salt reaction product takes place by the addition of the polyamine to the polyepoxide/quaternary ammonium salt and after the addition, the reaction mixture is allowed to stand with stirring at an elevated temperature, generally ranging from about 25°-100° C. and preferably about 30°-70° C. At these temperature ranges the reaction can be completed in about 0.5 to about 2.0 hours.

In preparing the water reducible curing agents of the present invention, the individual polyepoxide, quaternary ammonium salt and polyamine reactants can be added step-wise in the same reaction vessel. Alternatively, the reaction can be carried out in two separate vessels wherein the polyepoxide is reacted with the quaternary ammonium salt in a first vessel. After the epoxy-quaternary ammonium salt reaction is completed, the reaction product is pumped or otherwise transferred to a second vessel containing the polyamine reactant dissolved in water. The multivessel reaction procedure is preferred since it allows for more accurate temperature control of the reaction of the polyamine epoxy-quaternary ammonium salt reaction exotherm and allows for more efficient cleaning of the reaction vessel.

The water borne epoxy resin coating systems formulated using the novel curing agents of the present invention cure readily at ambient temperatures to produce film properties such as gloss, dry times, and water resistance which are greatly enhanced.

The water reducible curing agents of the present invention can be used with various types of epoxy resins. Generally speaking, best results have been achieved with liquid bisphenol A-epichlorohydrin type resins with epoxy equivalent weights of about 175 to 195. It is contemplated, however, that many other water dispersible epoxy resins can be used and that resins having epoxy equivalent weights of up to 900 are curable with the curing agents of the present invention. Specific examples of commercially available liquid epoxy resins which may be cured using the water reducible curing agents of the present invention include Epotuf ® 37-140 (Reichhold Chemicals, Inc.), the diglycidyl ether of 2,2-bis-(4-hydroxyphenyl) propane having an average molecular weight of 370.

The curing agents of the present invention exhibit excellent dispersibility in water and exist as distinct dispersed particles rather than a solution in water. In preparing water borne epoxy resin coating systems, the epoxy resin component is normally present as a dispersion of distinct particles. In water borne epoxy resin coating systems, having the epoxy resin and the curing agent both dispersed in the aqueous medium as distinct particles results in a substantial improvement in the chemical stability of the mixed system as the probability of the amine groups present in the curing agent coming into contact and thereby reacting with the epoxy groups of the resin is reduced due to the physical separation of the individual particles.

This is in contrast with water borne epoxy resin coating systems wherein the curing agent exists as a solution in water, for example, in the aqueous epoxy resin/epoxy amine adduct coating system of the type disclosed in U.S. Pat. No. 4,246,148 to Shimp et al, in which the curing agent, a polyamine terminated epoxy resin endcapped with a monoepoxide is salted with acetic acid to effect its dissolution in the aqueous medium in which an epoxy resin is dispersed in particulate form.

As will hereinafter be demonstrated, when contrasted with the dissolved curing agents of U.S. Pat. No. 4,246,148 to Shimp et al, the epoxy resin coating systems catalyzed by curing agents in the dispersed particulate form of the type prepared in the present invention exhibit a substantial increase in the usable room temperature pot life of the coating system.

In addition to the formulation of water borne epoxy resin coatings exhibiting improved chemical stability by the use of the curing agents of the present invention, due to the relatively high molecular weight of the curing agents, the drying time of the epoxy resin system is substantially decreased.

Curable aqueous epoxy resin coating systems having incorporated therein the curing agents of the present invention can contain additives commonly used in the formulation of coatings to improve the appearance and physical properties of the cured film as well as the stability and handling properties of the coating.

If colored coating compositions of epoxy resins and inventive curing agents are to be prepared, pigments such as titanium dioxide, iron oxide, carbon black, and metal oxides can be included. Coating systems based on the curing agents of the present invention can have a pigment volume concentration (PVC) varying from about 5 to 50% and preferably about 10 to 40%.

Other additives including fillers such as calcium carbonate, talc, silica, and wollastonite can be used. Still further additives can be used to improve pigment dispersion, reduce foaming, decrease filler settling, improve flow and leveling, and improve corrosion resistance.

The aqueous compositions containing epoxy resins and the curing agent of the present invention can be applied to substrates in any known way. Suitable methods include: brush application, rolling, spraying, casting, dipping and the like.

The water borne compositions containing epoxy resins and the inventive curing agents can also be used as adhesives.

The invention is additionally demonstrated in connection with the following examples which are illustrative of the present invention. In the examples, Epoxy Resin A is the diglycidyl ether of 2,2-bis (4-hydroxyphenyl) propane with an average molecular weight of 370 which is commercially available under the trademark Epotuf ® 37-140 from Reichhold Chemicals, Inc.;

Epoxy Resin B is the glycidyl ether of a phenol-formaldehyde condensate with an average epoxy functionality of 3.6. This epoxy novolac is commercially available from Dow Chemical under the trademark D.E.N. ® 438 or Dainippon Ink and Chemicals under the trademark Epiclon ®738;

Epoxy Resin C is Epoxy Resin A reacted with bisphenol A to a molecular weight of 1000 and an epoxide equivalent weight of about 475-575. This epoxy resin is commercially available from Reichhold Chemicals, Inc. under the trademark Epotuf ® 37-001.

Epoxy Resin D is Epoxy Resin A blended with 8% of a non-ionic surfactant and has an epoxide equivalent weight of 203. This epoxy resin is commercially available from Reichhold Chemicals, Inc. under the trademark EPOTUF ® 95-478.

In the examples and throughout the specification, all parts and percentages are by weight unless otherwise specified.

EXAMPLE 1

Water Reducible Curing Agent Based on M-xylene Diamine Adduct

A. Preoaration of Licuid Polveooxide 805 grams of Epoxy Resin A, 805 grams Epoxy Resin B and 173 grams bisphenol A were measured into a 3-liter, 4-necked flask equipped with mechanical agitator, nitrogen gas inlet tube, temperature controller, condenser and heating mantle. Under an inert gas atmosphere of nitrogen, the temperature of the flask was raised to 80° C. and 0.8 grams ethyltriphenyl phosphonium acetate (70% in methanol) was added to the heated mixture. The temperature of the mixture was then increased to 150° C. and this temperature maintained for 0.5 hour. Thereafter, heating was discontinued and 450 grams of ethylene glycol monopropyl ether was slowly added to the mixture in the flask through an addition funnel. The resulting multifunctional liquid epoxy intermediate product exhibited an epoxide equivalent weight (solids) of 247, a solids content of 79.8% and a Gardner-Holdt 25° C. viscosity of Z2.

The product obtained in Example 1A was used as the epoxy intermediate for the preparation of curing agents according to the invention.

B. Preparation of Epoxy-Quaternary Ammonium Salt Intermediate Reaction Product 225 grams of the epoxy intermediate prepared in Example 1A (0.726 equivalents epoxy) were charged into a one liter 4-necked reaction flask equipped as in Example 1A. Nitrogen was passed through the epoxy intermediate and the temperature was raised to 80° C. At this temperature, 24 grams of a quaternary ammonium salt which had been previously prepared by mixing 15 grams of N-methyl morpholine (0.148 moles) and 9 grams glacial acetic acid (0.15 moles) in a separate flask was added instantly to the reaction vessel. Thereafter, 36 grams of deionized water was added to the reaction vessel and the vessel was maintained at 80° C. for 1 hour to obtain the quaternized epoxy intermediate.

C. Preparation of Water Reducible Epoxy Curing Agent 400 grams deionized water, and 79 grams (0.58 mole) meta-xylene diamine were charged into in a one liter, 4-necked reaction flask equipped as in Example 1A. The temperature of the flask was raised to 30° C. Nitrogen was passed through and the epoxy-quaternary ammonium salt intermediate prepared in Example 1B was added with stirring. After completion of the addition, the mixture was stirred for an hour at 50° C. An aqueous dispersion containing the curing agent was obtained which had the following physical properties:

| Viscosity, Gardner-Holdt | Y |
| --- | --- |
| % Solids | 33.4 |
| Solvent Composition | 90.6% water |
| | 9.4% ethylene glycol monopropyl ether |
| Particle Size | 0.135 microns |
| Appearance | opalescent liquid |

EXAMPLE 2

Water Reducible Curing Agent Based on Isophorone Diamine Adduct 225 grams of the multifunctional epoxy intermediate (0.726 equivalents epoxy) prepared in Example 1A was added to a one liter, 4-necked flask equipped as in Example 1A. The temperature was raised to 80° C. and 24 grams of the N-methyl morpholine/acetic acid quaternary ammonium salt prepared in Example 1B was added to the flask together with 36 grams of deionized water. The reaction was held for 60 minutes at 80° C. after which time, heating was discontinued and 400 grams of deionized water were added to the flask. The flask contents were cooled to 45° C. and 98.5 grams of isophorone diamine (0.58 moles) was added to the flask. On completion of the addition, the mixture was stirred and the heat generated by the reaction raised the temperature to 59° C. Thereafter, the temperature dropped to 50° C. and the contents of the flask were maintained at this temperature for 1.5 hours. The resultant dispersion had an opalescent appearance and had the following physical properties:

| Viscosity, Gardner-Holdt | Z5 |
| --- | --- |
| % Solids | 36.2 |
| Gardner-Delta Color | 3 |
| Particle Size | 1.13 microns |

EXAMPLE 3:

Epoxy Curing Agent Emulsion Based on 540 EEW Epoxy and Isophorone Diamine

Into a one-liter reaction flask equipped as in Example 1A was charged 180 grams of Epoxy Resin C with an epoxide equivalent weight (EEW) of 540 (0.333 equivalents epoxy) and 45 grams of ethylene glycol monopropyl ether. The resin was dissolved while heating to 80° C. with agitator on and nitrogen cover. At 80° C., a quaternary ammonium salt prepared by mixing 7.5 grams of n-methyl morpholine, 4.5 grams of glacial acetic acid, and 18 grams of deionized water was added to the flask. The reaction was held at 75°-80° C. for 45 minutes after which time the resin solution had an epoxide equivalent weight of 1074 (0.237 equivalents epoxy). Heating was discontinued and 250 grams of deionized water was added to the flask by addition funnel. After the water addition, the temperature dropped to 45° C. and 20 grams of isophorone diamine (0.118 moles) was added to the flask. The reaction was held for 30 minutes at 45°-50° C. and then dispensed. The final product was an opaque emulsion with the following properties:

| Weight Average Molecular Weight | 7492 |
| --- | --- |
| Number Average Molecular Weight | 1988 |
| Viscosity, cps @ 25° C. | 30 |
| % Solids | 40.2 |
| Particle Size | 0.18 microns |
| Amine Hydrogen Equivalent Weight | 905 on solids |
| pH | 9.3 |
| Weight per gallon | 8.95 lb. |
| Stability | greater than 8 weeks @ 49° C. |

EXAMPLE 4:

Epoxy Coatings Based on Water Reducible Curing Agent

A pigmented, epoxy emulsion was prepared by using a high speed, air motor driven dispersing blade to mix 153 grams of Epoxy Resin D, 131.5 grams titanium dioxide, 32.9 grams of a surface modified wollastonite having the brand name Wollastokup TM 10-ES (manufactured by NYCO) and 33 grams of a modified zinc phosphate having the brand name Heucophos TM ZPA (manufactured by Heubach, Inc.). After reaching a Hegman 6 grind, 73 grams of deionized water was added.

To 100 grams of the pigmented epoxy emulsion prepared above was added 88 grams of the water reducible curing agent prepared in Example 2. This curable epoxy coating composition was applied to cold rolled steel panels using a wire wound rod to produce a wet film layer thickness of 3 mils. The coatings had a set to touch time of 15 minutes and a Zappon Tack Free time of 50 minutes. After 20 hours of exposure to the air at room temperature, the coating exhibited excellent water resistance, that is, after a 5 hour exposure to water no effect was noted in the coating.

EXAMPLE 5:

Water Reducible Curing Agent Based on M-xylene Diamine and Isophorone Diamine

A. Preoaration of Multifunctional Epoxy Intermediate 119.3 grams of Epoxy Resin A, 18 grams Epoxy Resin B and 42.7 grams bisphenol A were measured into a 1 liter, 4-necked flask equipped with mechanical agitator, nitrogen gas inlet tube, temperature controller, condenser and heating mantle. Under an inert gas atmosphere of nitrogen, the temperature of the flask was raised to 80° C. and 0.2 grams ethyltriphenyl phosphonium acetate (70% in methanol) was added to the heated mixture. The temperature of the mixture was then increased to 150° C. and this temperature maintained for 0.5 hour. Thereafter, heating was discontinued and 45 grams of ethylene glycol monopropyl ether was slowly added to the mixture in the flask through an addition funnel. The resulting multifunctional liquid epoxy intermediate product exhibited an epoxide equivalent weight (solids) of 517 and a solids content of 79.8%.

The product obtained in Example 4A was used as the epoxy intermediate for the preparation of curing agents according to the invention.

B. Preparation of Epoxy-Quaternary Ammonium Salt Intermediate Reaction Product 225 grams of the epoxy intermediate prepared in Example 1A (0.348 equivalents epoxy) were charged into a one liter 4-necked reaction flask equipped as in Example 1A. Nitrogen was passed over the epoxy intermediate and the temperature was raised to 75° C. At this temperature, 30 grams of a quaternary ammonium salt solution which had been previously prepared by mixing 7.5 grams of N-methyl morpholine (0.074 moles) and 4.5 grams glacial acetic acid (0.074 moles) and 18 grams of deionized water was added to the reaction vessel. The vessel was maintained at 75° C. for 45 minutes to obtain the quaternized epoxy intermediate. The quaternized epoxy intermediate had an epoxide equivalent weight (solution) of 968 (0.26 equivalents epoxy).

250 grams deionized water was charged to the reaction flask and the quaternized epoxy intermediate formed an opaque emulsion. Immediately thereafter, 8.8 grams of m-xylene diamine (0.065 moles) and 11.2 grams isophorone diamine (0.066 moles) were charged to the flask. The reaction was held at 50° C. for 0.5 hour. An aqueous dispersion was obtained which had the following physical properties:

| | |
|---|---|
| Viscosity, centipoise at 25° C. | 50 |
| % Solids | 40.4 |
| Solvent Composition | 85.6% Water |
| | 14.4% ethylene glycol monopropyl ether |
| Particle Size. | 0.103 microns |
| Molecular Weight, Weight Average | 17,034 |
| Molecular Weight, Number Average | 2,564 |
| Amine Hydrogen Equivalent Weight, Solids | 821 |

EXAMPLE 6

Clear Coating Comparison

An unpigmented, clear coating composition was prepared by mixing 10 grams of Epoxy Resin D, 100 grams of the water reducible curing agent of Example 5, and 2.8 grams of deionized water. The clear epoxy coating composition was applied to cold rolled steel panels in a wet film layer thickness of 3 mils. The drying times and early water resistance (1 hour exposure after 20 hour room temperature cure) is recorded in Table 1 which follows.

For purposes of comparison, clear coating from a water borne epoxy resin coating system based on a polyamine reacted epoxy resin capped with a monoepoxide of the type disclosed in U.S. Pat. No. 4,246,148 to Shimp et al and commercially available from Hi-Tek Polymers was prepared. The drying times and early water resistance of this comparative coating is also recorded in Table 1.

TABLE 1

| | Clear Coating of Example 5 | Comparative Clear Coating |
|---|---|---|
| Drying Time: | | |
| (a) Set to Touch | 0.25 hrs | 1.0 hrs |
| (b) Tack Free | 0.6 hrs | 7.0 hrs |
| (c) Pot Life | >8 hrs | 6 hrs |
| Early Water Resistance | no effect | slight softening |

In Table 1, the expression "pot life" is intended to mean the time elapsing before a 100 gram sample of the aqueous coating composition gels or before the viscosity of the dispersion rises to such an extent that it is no longer possible to process it properly.

By reference to the above table, it is immediately apparent that aqueous epoxy coating compositions utilizing the curing agent of the present invention exhibit more rapid drying times and increased pot life and water resistance when compared to presently available commercial room temperature curable water borne based epoxy coating compositions.

What is claimed is:

1. A particulate water reducible curing agent for a water dispersible epoxy resin composition having an average particle size of about 0.05 to about 5 microns, and consisting essentially of the adduct reaction product of a polyamine with the unreacted epoxy groups of an intermediate; wherein said intermediate comprises the reaction product of a chemical excess of a polyfunctional epoxide compound with a quaternary ammonium salt in the ratio of about 0.05:1 to about 0.8:1 equivalents, respectively, so that the intermediate reaction product contains unreacted epoxy groups, and wherein said quaternary ammonium salt is the reaction product of a tertiary amine and a monocarboxylic acid having 1 to 3 carbon atoms.

2. The curing agent of claim 1 wherein the polyfunctional epoxide/quaternary ammonium salt reaction intermediate product containing the unreacted epoxy groups is condensed with the polyamine in the ratio of about 0.3:1.0 to about 1.3:1.0 moles of amine to epoxy equivalents.

3. The curing agent of claim 1 wherein the polyfunctional epoxy compound is the glycidyl polyether of a dihydric phenol having a molecular weight of about 345 to about 400 and an epoxy equivalent weight of about 175 to 200.

4. The curing agent of claim 1 wherein the polyfunctional epoxy compound comprises an epoxy novolac.

5. The curing agent of claim 4 wherein the epoxy novolac is the glycidyl ether of a phenol-formaldehyde condensate, and has an average epoxy functionality of about 2 to about 7.5.

6. The curing agent of claim 1 wherein the polyfunctional epoxy compound is a mixture of the glycidyl polyether of a dihydric phenol and an epoxy novolac resin.

7. The curing agent of claim 1 wherein the polyfunctional epoxy compound is a mixture of a glycidyl ether of a dihydric phenol and an epoxy novolac resin reacted in the presence of 0 to about 40% by weight of a polyhydric phenol.

8. The curing agent of claim 7 wherein the polyhydric phenol is bisphenol A.

9. The curing agent of claim 1 wherein the quaternary ammonium salt is the reaction product of N-methyl morpholine and acetic acid.

10. The curing agent of claim 1 wherein the polyamine is meta-xylene diamine.

11. The curing agent of claim 1 wherein the polyamine is isophorone diamine.

12. A process for preparing a particulate water reducible curing agent for a water dispersible epoxy resin composition which consists essentially of:
   (a) first reacting a chemical excess of a polyfunctional epoxide compound with a quaternary ammonium salt in the ratio of about 0.05:1 to about 0.8: equivalents, respectively, to prepare a reaction product containing unreacted epoxy groups; and
   (b) condensing the unreacted epoxy groups of the reaction product with a polyamine, to form an adduct; wherein said quaternary ammonium salt is the reaction product of a tertiary amine and a monocarboxylic acid having 1 to 3 carbon atoms; and wherein said curing agent has an average particle size of about 0.05 to about 5 microns.

13. The process of claim 12 wherein the reaction product containing unreacted epoxy groups is condensed with the polyamine in the ratio of about 0.3:1.0 to about 1.3:1 moles of amine to epoxy equivalents.

14. The process of claim 12 wherein the polyfunctional epoxide compound is the glycidyl polyether of a dihydric phenol having a molecular weight of about 345 to about 400 and an epoxy equivalent weight of about 175 to 200.

15. The process of claim 12 wherein the polyfunctional epoxide compound comprises an epoxy novolac.

16. The process of claim 15 wherein the epoxy novolac is the glycidyl ether of a phenol-formaldehyde condensqte, and has an average epoxy functionality of about 2 to about 7.5.

17. The process of claim 12 wherein the polyfunctional epoxide compound is a mixture of the glycidyl polyether of a dihydric phenol and an epoxy novolac resin.

18. The process of claim 12 wherein the polyfunctional epoxide compound is a mixture of a glycidyl ether of a dihydric phenol and an epoxy novolac resin reacted in the presence of 0 to about 40% by weight of a polyhydric phenol.

19. The process of claim 18 wherein the polyhydric phenol is bisphenol A.

20. The process of claim 12 wherein the quaternary ammonium salt is the reaction product of N-methyl morpholine and acetic acid.

21. The process of claim 12 wherein the polyamine is meta-xylene diamine.

22. The process of claim 12 wherein the polyamine is isophorone diamine.

23. The process of claim 12 wherein before the quaternary ammonium salt reaction product is condensed with the polyamine, added to the quaternary ammonium salt reaction product prior to the addition of the polyamine at a concentration of about 30 to 80% by weight of the quaternary ammonium salt reaction product.

* * * * *

UNITED STATES PATENT AND TRADEMARK OFFICE
CERTIFICATE OF CORRECTION

PATENT NO. : 5,204,385　　　　　　　　　　　　　Page 1 of 2
DATED    : April 20, 1993
INVENTOR(S) : Bryan A. Naderhoff It is certified that error appears in the above-identified patent and that said Letters Patent is hereby corrected as shown below:

Column 3, line 15　　change "1,1-bis-(4-hydroxyphenyl)-propane", to --1,1-bis-(4-hydroxyphenyl)-ethane, 2,2-bis-(4-hydroxyphenyl)-propane,--.

Column 5, line 19　　change "formic acids" to --formic acid--.

Column 5 line 19　　change "acetic acids" to --acetic acid--.

Column 8 line 51　　change "Preoaration of Licuid Polveooxide" to --Preparation of Liquid Polyepoxide--.

Column 14 lines 11, 12 (claim 16, lines 2-3)　　change "condensqte" to --condensed--.

UNITED STATES PATENT AND TRADEMARK OFFICE
CERTIFICATE OF CORRECTION

PATENT NO. : 5,204,385

DATED : April 20, 1993

INVENTOR(S) : Bryan A. Naderhoff

It is certified that error appears in the above-indentified patent and that said Letters Patent is hereby corrected as shown below:

Column 14, line 34, after "polyamine," insert --water is--.

Signed and Sealed this

Eighteenth Day of January, 1994

Attest:

BRUCE LEHMAN

*Attesting Officer*      *Commissioner of Patents and Trademarks*